United States Patent
Jung et al.

(10) Patent No.: US 8,624,546 B2
(45) Date of Patent: Jan. 7, 2014

(54) NON-CONTACT POWER RECEPTION APPARATUS AND JIG FOR FABRICATING CORE FOR NON-CONTACT POWER RECEPTION APPARATUS

(75) Inventors: Chun-Kil Jung, Seoul (KR); Yoon-Sang Kuk, Seoul (KR)

(73) Assignee: Hanrim Postech Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/741,679

(22) PCT Filed: Dec. 11, 2009

(86) PCT No.: PCT/KR2009/007431
§ 371 (c)(1),
(2), (4) Date: May 6, 2010

(87) PCT Pub. No.: WO2010/068063
PCT Pub. Date: Jun. 17, 2010

(65) Prior Publication Data
US 2011/0316475 A1    Dec. 29, 2011

(30) Foreign Application Priority Data

Dec. 12, 2008  (KR) .................. 10-2008-0126269
Jun. 10, 2009  (KR) .................. 10-2009-0051316
Sep. 8, 2009   (KR) .................. 10-2009-0084388

(51) Int. Cl.
*H02J 7/00* (2006.01)
(52) U.S. Cl.
USPC ......................................................... 320/108
(58) Field of Classification Search
USPC ......................................................... 320/108
See application file for complete search history.

(56) References Cited

U.S. PATENT DOCUMENTS

| 5,850,135 | A  | * | 12/1998 | Kuki et al. ........... 320/108 |
| 7,180,265 | B2 | * | 2/2007  | Naskali et al. ...... 320/108 |
| 8,041,227 | B2 | * | 10/2011 | Holcombe et al. ... 398/138 |
| 8,073,488 | B2 | * | 12/2011 | Yoneda ............... 455/557 |
| 8,111,042 | B2 | * | 2/2012  | Bennett .............. 320/108 |
| 8,129,942 | B2 | * | 3/2012  | Park et al. .......... 320/108 |

(Continued)

FOREIGN PATENT DOCUMENTS

| JP | 11-332135   | 11/1999 |
| JP | 2001-238372 | 8/2001  |

(Continued)

OTHER PUBLICATIONS

Japanese Office Action dated Feb. 29, 1962, issued in corresponding Japanese Patent Application No. 2011-540609.

(Continued)

*Primary Examiner* — Arun Williams
(74) *Attorney, Agent, or Firm* — Stein IP, LLC

(57) ABSTRACT

A non-contact power reception apparatus is provided, in which a power reception coil for a charging system and a loop antenna for an electronic settlement system are mounted on a battery pack and a cover case of a portable terminal such that the power reception coil is arranged in the center thereof and the loop antenna is disposed outside the power reception coil, so that a mode of receiving a wireless power signal and a mode of transmitting and receiving data are selectively performed, thereby preventing interference from harmonic components and enabling non-contact charging and electronic settlement using a single portable terminal. A jig for fabricating a core to be mounted to the non-contact power reception apparatus is provided.

4 Claims, 13 Drawing Sheets

(56) References Cited

U.S. PATENT DOCUMENTS

| | | | |
|---|---|---|---|
| 2004/0004460 A1* | 1/2004 | Fitch et al. | 320/108 |
| 2004/0145342 A1* | 7/2004 | Lyon | 320/108 |
| 2005/0127866 A1* | 6/2005 | Hamilton et al. | 320/108 |
| 2005/0127867 A1* | 6/2005 | Calhoon et al. | 320/108 |
| 2005/0162125 A1* | 7/2005 | Yu et al. | 320/108 |
| 2006/0113955 A1* | 6/2006 | Nunally | 320/108 |
| 2007/0069687 A1* | 3/2007 | Suzuki | 320/108 |
| 2008/0211455 A1* | 9/2008 | Park et al. | 320/108 |
| 2008/0238364 A1* | 10/2008 | Weber et al. | 320/108 |
| 2011/0025264 A1* | 2/2011 | Mochida et al. | 320/108 |

FOREIGN PATENT DOCUMENTS

| | | |
|---|---|---|
| JP | 2002-078247 | 3/2002 |
| JP | 2008-236888 | 10/2008 |
| KR | 10-0819604 | 4/2008 |
| KR | 10-2009-0091440 A | 8/2009 |

OTHER PUBLICATIONS

Japanese Office Action dated Dec. 3, 2012, issued in corresponding Japanese Patent Application No. 2011-540609.

* cited by examiner

Fig. 11
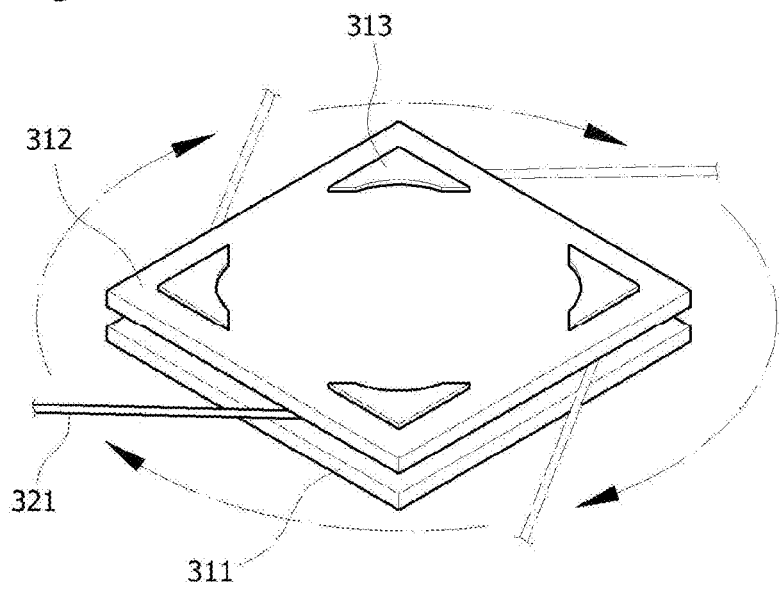
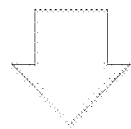
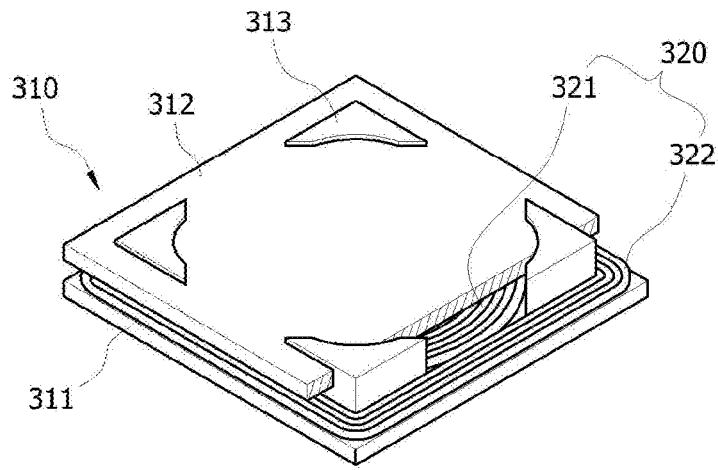

Fig. 13
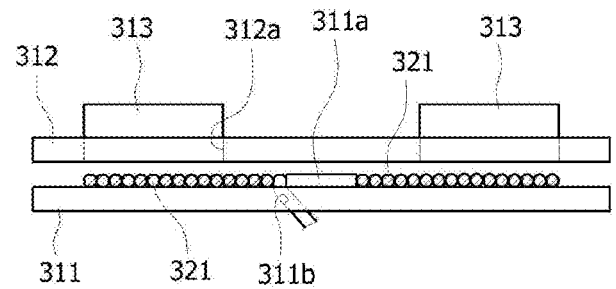
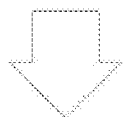
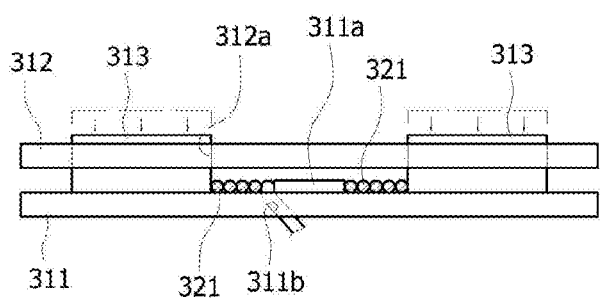
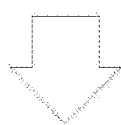
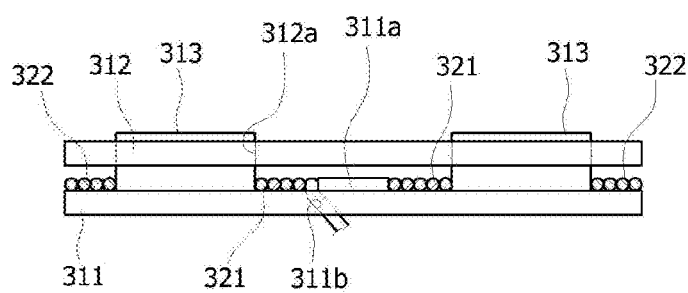

NON-CONTACT POWER RECEPTION APPARATUS AND JIG FOR FABRICATING CORE FOR NON-CONTACT POWER RECEPTION APPARATUS

TECHNICAL FIELD

The present invention relates to a non-contact power reception apparatus and a jig for fabricating a core for the non-contact power reception apparatus, and more particularly to a non-contact power reception apparatus, in which a power reception coil for a charging system and a loop antenna for an electronic settlement system are mounted on a battery pack and a cover case of a portable terminal such that the power reception coil is arranged in the center thereof and the loop antenna is disposed outside the power reception coil, so that a mode of receiving a wireless power signal and a mode of transmitting and receiving data are selectively performed, thereby preventing interference from harmonic components and enabling non-contact charging and electronic settlement using a single portable terminal, and a jig for fabricating a core to be mounted to the non-contact power reception apparatus.

BACKGROUND ART

Generally, a battery pack is a kind of power supply that is charged with power (electric energy) received from an external charger and supplies the power so that portable electronic devices, such as cellular phones, personal digital assistants (PDAs) and the like can be operated, and consists of a battery cell which is charged with electric energy and circuits for charging and discharging the battery cell (supplying electric energy to portable terminals).

The electrical connection between the battery pack, which is used in the portable terminals, and the charger for charging electric energy to the battery pack may be achieved using a connector supply system, which receives the power from a regular power source and converts the voltage and current thereof to correspond to those of the battery pack, and supplies the electric power to the battery pack via a connector of the corresponding battery pack.

However, when the charger and the batteries are connected or disconnected to replenish the electric power of the batteries using such a connector supply system, there may be drawbacks, such as instant discharge owing to the difference in potential between the charger connector and the battery connector, the risk of fire and concomitant damage due to fire caused by the presence of foreign substances gathered on both connectors, and the like.

Further, accumulated humidity will cause the discharge of the battery through the battery connector and other problems will occur, such as the reduction in the life and performance of the battery pack, and the like.

To solve the above-mentioned problems, a non-contact charging system using a wireless power transmission and reception system was recently proposed.

Meanwhile, portable terminals that have recently proliferated include an electronic settlement system using a Local Area Network (LAN), so that settlement is carried out by bringing the portable terminals into proximity with electronic settlement devices and conducting a settlement process.

Such an electronic settlement system essentially includes a loop antenna, an absorber, an impedance matching circuit and the like in the portable terminal.

In order to mount, in a single portable terminal, both the non-contact charging system using the wireless power transmission and reception technology and the settlement system using the LAN, a power reception coil of the charging system and the loop antenna of the electronic settlement system should be mounted in the portable terminal and operated.

However, due to interference from harmonic components (n times a fundamental wave), which is produced in the frequency band (e.g. 13.56 MHz) of the electronic settlement system and the frequency band (e.g. hundreds kHz) of the charging system, problems such as the unstable transmission of signals occur, therefore failing to perform desired functions.

The information disclosed in this Background of the Invention section is only for the enhancement of understanding of the background of the invention and should not be taken as an acknowledgment or any form of suggestion that this information forms the prior art that would already be known to a person skilled in the art.

DISCLOSURE

Technical Problem

To solve the above-mentioned problem, the present invention is directed to a non-contact power reception apparatus, in which a power reception coil for a charging system and a loop antenna for an electronic settlement system are mounted on a battery pack and a cover case of a portable terminal while interference from harmonic components is prevented, thereby enabling non-contact charging and electronic settlement using a single portable terminal.

Another object of the present invention is to provide a non-contact power reception apparatus having the power reception coil arranged in the center thereof and the loop antenna disposed outside the power reception coil, so that a mode of receiving a wireless power signal and a mode of transmitting and receiving data are selectively performed.

A further object of the present invention is to provide a jig for fabricating a double-structure core which is mounted in the non-contact power reception apparatus.

The information disclosed in this Background of the Invention section is only for the enhancement of understanding of the background of the invention and should not be taken as an acknowledgment or any form of suggestion that this information forms the prior art that would already be known to a person skilled in the art.

Technical Solution

In accordance with an aspect of the present invention, the non-contact power reception apparatus may include a common transmission and reception block selectively performing a mode of receiving a wireless power signal and a mode of transmitting and receiving data, a rectification block rectifying the power signal received by the common transmission and reception block in the mode of receiving the wireless power signal, a received-power control block controlling the power signal rectified by the rectification block, a charging control block controlling charging of a battery pack using electric energy of the power signal controlled by the received-power control block, and a data processing block transmitting and receiving data for electronic settlement with an external electronic device via the common transmission and reception block in the mode of transmitting and receiving data.

The common transmission and reception block may include a power reception coil receiving the wireless power signal, a loop antenna for the transmission and reception of data, a mode switching unit selecting either one of the power reception coil and the loop antenna and allowing electrical connection to either one of the rectification block and the data processing block, and a mode control unit detecting a received-voltage of the power reception coil and controlling a switching operation of the mode switching unit.

The mode control unit may perform a control operation so that, if the detected received-voltage is higher than a reference voltage, the mode switching unit performs the switching operation to electrically connect the power reception coil and the rectification block, and if the detected received-voltage is lower than the reference voltage, the mode switching unit performs the switching operation to electrically connect the loop antenna and the data processing block.

The mode control unit may include a voltage detector for detecting the received-voltage of the power reception coil, comparing the detected received-voltage with the reference voltage and outputting the comparison result.

In accordance with another aspect of the present invention, the non-contact power reception apparatus may include, in a portable terminal, a common transmission and reception block selectively performing a mode of receiving a wireless power signal and a mode of transmitting and receiving data, a rectification block rectifying the power signal received by the common transmission and reception block in the mode of receiving the wireless power signal, a received-power control block controlling the power signal rectified by the rectification block, a charging control block controlling charging of a battery pack using electric energy of the power signal controlled by the received-power control block, and a data processing block transmitting and receiving data for electronic settlement with an external electronic device via the common transmission and reception block in the mode of transmitting and receiving data. The portable terminal may include a terminal body capable of performing wireless communication, a rechargeable battery pack supplying electric energy to the terminal body, a cover case for protection of the battery pack, and at least one connector module electrically connecting the respective terminal body, the battery pack and the cover case, in which a first connector module of the battery pack is connected with a second connector module of the terminal body, in which the common transmission and reception block is arranged in the battery pack in such a manner as to be connected with the first connector module of the battery pack and a third connector module of the terminal body, in which the rectification block, the reception power control block and the charging block are sequentially arranged in the terminal body to extend from the third connector module to the second connector module, and in which the data processing block is arranged between the third connector module and the received-power control module.

In accordance with further another aspect of the present invention, the non-contact power reception apparatus may include, in a portable terminal, a common transmission and reception block selectively performing a mode of receiving a wireless power signal and a mode of transmitting and receiving data, a rectification block rectifying the power signal received by the common transmission and reception block in the mode of receiving the wireless power signal, a received-power control block controlling the power signal rectified by the rectification block, a charging control block controlling charging of a battery pack using electric energy of the power signal controlled by the received-power control block, and a data processing block transmitting and receiving data for electronic settlement with an external electronic device via the common transmission and reception block in the mode of transmitting and receiving data. The portable terminal may include a terminal body capable of performing wireless communication, a rechargeable battery pack supplying electric energy to the terminal body, a cover case for protection of the battery pack, and at least one connector module electrically connecting the terminal body, the battery pack and the cover case, in which a first connector module of the battery pack is connected with a second connector module of the terminal body, in which the common transmission and reception block is arranged in the cover case in such a manner as to be connected with a fourth connector module of the cover case, the fourth connector module being connected with a third connector of the terminal body, in which the rectification block, the reception power control block and the charging block are sequentially arranged in the terminal body to extend from the third connector module to a second connector module, and in which the data processing block is arranged between the third connector module and the received-power control module, the second connector module being connected with a first connector module of the battery pack.

A connector of the fourth connector module, which is connected with the common transmission and reception block arranged in the cover case, may have a shape of a leaf spring, and be electrically connected with a connector of the first connector module of the battery pack via a through-hole provided in a cover of the cover case.

The common transmission and reception block may include a power reception coil receiving the wireless power signal, a loop antenna for transmission and reception of data, a mode switching unit selecting any one of the power reception coil and the loop antenna and allowing electrical connection to any one of the rectification block and the data processing block, and a mode control unit detecting a received-voltage of the power reception coil and controlling a switching operation of the mode switching unit.

The mode control unit may perform a control operation so that if the detected received-voltage is higher than a reference voltage, the mode switching unit performs the switching operation to electrically connect the power reception coil and the rectification block, and if the detected received-voltage is lower than the reference voltage, the mode switching unit performs the switching operation to electrically connect the loop antenna and the data processing block.

The mode control unit may include a voltage detector for detecting the received-voltage of the power reception coil, comparing the detected received-voltage with the reference voltage and outputting the comparison result.

In accordance with still another aspect of the present invention, the jig for fabricating a core for a non-contact power reception apparatus may include a lower planar disk having a center winding protrusion thereon, an upper planar disk placed on the lower disk and having at least one slide hole therein, and at least one guide unit inserted into the slide hole so as to be vertically movable.

The lower disk may have a through-hole adjacent to the winding protrusion.

The guide unit may have a shape corresponding to a rectangular corner and an inner curved section.

In accordance with yet another aspect of the present invention, the method of fabricating a double-structure core using the jig for the non-contact power reception apparatus may include steps of: a) inserting a coil wire into the through-hole of the lower disk from a lower side thereof and drawing the coil wire upwards, b) winding the drawn coil wire about the winding protrusion to form a first coil, c) after the completion of formation of the first coil, sliding and lowering a plurality of guide units disposed in the upper disk, d) winding a coil wire around an outer surface of the guide unit to form a second coil, and e) separating the first and second coils from a jig for winding a coil.

The step b) includes b-1) winding the coil wire about the winding protrusion to extend the diameter of the first coil, and b-2), if the diameter of the first coil matches that of an imaginary circle formed by the curved surface of the guide unit, completing the formation of the first coil.

The step d) includes d-1) winding the coil wire extending from the first coil about an imaginary rectangle defined by the outer surface of the guide unit to form the second coil, and d-2), if the size of the second coil matches the size of the lower or upper disk, completing the formation of the second coil.

Advantageous Effects

According to the above-mentioned construction, the present invention has the following effects:

The power reception coil of the charging system and the loop antenna of the electronic settlement system are mounted in the battery pack and the cover case of the portable terminal, so that non-contact charging and electronic settlement are both performed in the single portable terminal.

Particularly, the non-contact charging system and the electronic settlement system, which use different respective frequency bands, are operated at the same time and interference between the two systems is prevented, so that the reliability is improved.

The control modules of the non-contact charging system using the wireless power transmission and reception technology and the electronic settlement system using LAN are arranged in diverse forms, so that non-contact charging and electronic settlement can be carried out for battery packs having diverse structures.

In fabricating the core for the non-contact reception apparatus using the jig, the corresponding core is configured to have the shape of both a circle and a rectangle, so that the mobility and transmission efficiency of the corresponding core (secondary side) can be advantageously improved at the same time, by combining the advantages of a circular coil and a rectangular coil.

Thus, adaptability to various kinds of portable terminals and the like can be considerably improved.

The jig for winding a coil, which facilitates fabricating the core, and the method of easily fabricating the core using the jig are further provided, thereby having effects of improved productivity, reduced cost, increased production and the like in fabricating the double-structure core.

Thus, the reliability of the non-contact charging system that includes the non-contact power reception apparatus and the non-contact power transmission apparatus can be improved, as can the competitiveness of related products, such as portable terminals, battery packs, and the like.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DESCRIPTION OF DRAWINGS

FIGS. 10 and 11 are perspective views illustrative of a procedure of fabricating a double-structure core using the jig of FIG. 8;

FIG. 13 is a cross-sectional view illustrative of the procedure shown in FIGS. 10 and 11.

BEST MODE

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A non-contact power reception apparatus and a jig for fabricating a core for the power reception apparatus according to the present invention are variously applicable, and preferred embodiments thereof will now be described in detail with reference to the accompanying drawings.

Figure 1:
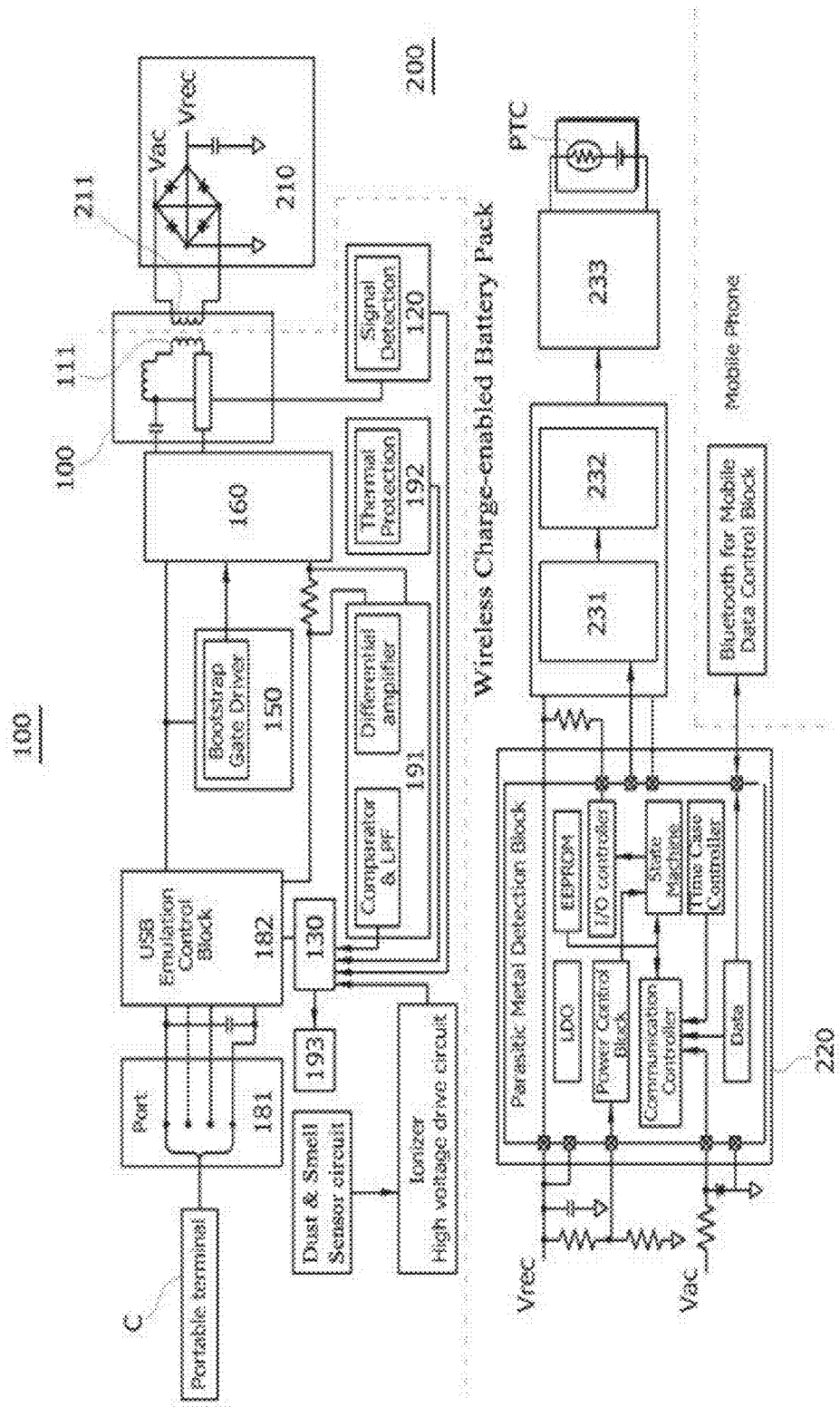
FIG. 1 is a schematic circuit diagram of an exemplary non-contact power reception apparatus in accordance with the present invention.

FIG. 1 is a schematic circuit diagram of an exemplary non-contact power transmission system in accordance with the present invention, which includes a non-contact power transmission apparatus 100 for sending out a wireless power signal and a non-contact power reception apparatus 200 receiving the wireless power signal and charging a battery cell with it.

The non-contact power transmission apparatus 100 includes a primary core 110, an identifier 120, a wireless power transmission controller 130, a switching controller 140, an operating driver 150, a series resonance converter 160, and a feedback circuit 170.

The primary core 110 consists of a plurality of power transmission cores 111 and is connected in parallel with the series resonance converter 160.

The identifier 120 detects a change in the load of the primary core 110 and determines whether the change is induced by the non-contact power reception apparatus 200 or not. Thus, the identifier serves both to detect the change in the load and to analyze and process a data signal code of an AC signal of the signals transmitted from the non-contact power reception apparatus 200.

The wireless power transmission controller 130 receives and checks the determination result from the identifier 120, and, if the change in the load is induced by the non-contact power reception apparatus 200, sends out a power control signal to the operating driver 150 via the primary core 110 to transmit the wireless power signal.

Then, the controller 130 analyzes and processes the data signal filtered by the identifier 120 and correspondingly controls the operating driver 150. In addition, the controller creates a data signal (e.g. an ID asking signal) and transmits it to the non-contact power reception apparatus 200 via the primary core 110.

The switching controller 140 controls the switching operation of a plurality of switches (not shown), which are provided between the series resonance circuit 160 and the power transmission cores 111.

The operating driver 150 controls the operation of the series resonance converter 160 depending upon the intensity of the wireless power signal that is to be transmitted.

The series resonance converter 160 creates a transmission power source for creating a wireless power signal to be transmitted under the control of the operating driver 150, and supplies it to the primary core 110.

That is, when the wireless power transmission controller 130 transmits a power control signal for transmitting a wireless power signal, which has a required power value, to the operating driver 150, the operating driver 150 controls the operation of the series resonance converter 160 to correspond to the transmitted power control signal, and the series resonance converter 160 applies to the primary core 110 a transmission power source, which corresponds to the required power value, under the control of the operating driver 150, thereby transmitting a wireless power signal having the required intensity.

When the primary core 110 receives the code data of an AC signal, the feedback circuit 170 extracts the code data of the AC signal from a DC signal applied to the primary core 110. The feedback circuit 170 includes an RC filter circuit section (not shown), which is electrically connected with ends of the power transmission cores 111 of the primary core 110 to remove a DC signal component (low frequency component), and an amplifying circuit section (not shown), which has an OP-AMP that is electrically connected with the RC filter circuit section.

That is, the low frequency signal, which is a DC signal component, is removed by the RC filter circuit section and the extracted AC signal component is amplified by the amplifying circuit section.

Thus, it is possible to transmit and receive a low-amplitude signal.

The non-contact power reception apparatus 200 to be supplied with power by receiving the wireless power signal includes a power reception coil 211 of a secondary core 220, which creates induced power using the transmitted wireless power signal, a rectifier 230, which rectifies the induced power, and a battery cell module (not designated), which charges a battery cell 270 with the rectified power.

This battery module includes a protection circuit, such as an overvoltage and overcurrent prevention circuit, a temperature detecting circuit and the like, and a charging management module, which collects and processes information such as the charged state of the battery cell and the like.

The non-contact power reception apparatus 200 further includes a wireless power receiver controller, which checks the current induced to the power reception coil 211 of the secondary core 220 and requests the control of the intensity of a wireless power signal based on the information on the charging of the battery cell, which is collected and processed by the battery cell module, and an ID transmitter, which, via the secondary core 220, transmits and receives the code data of an AC signal modulated in an AC modulation manner.

The non-contact power reception apparatus 200 further includes a capacitor C, which is connected in parallel with the power reception coil 211 of the secondary core 220 to remove a DC signal component, and a MOSFET, in which a drain terminal is serially connected with the capacitor.

The MOSFET performs on/off control under the control of the ID transmitter. The ID transmitter inputs the operation voltage of the MOSFET to the gate terminal of the MOSFET in correspondence with a duty rate, which is set to correspond to the control request for the intensity of the wireless power signal by the wireless power receiver controller.

That is, when the ID transmitter inputs an on-signal and an off-signal, which correspond to the operation voltage, to the gate terminal, the MOSFET creates and outputs a pulse width modulated (PWM) signal corresponding to voltage input to the gate terminal, and the PWM signal is transmitted to the non-contact power transmission apparatus 100 via the power reception core 211.

The non-contact power transmission apparatus 100 is supplied with power via a power supply port 181 from an adapter supplied with a regular power source, a power source of a USB port of a portable terminal such as a notebook, or the like.

The apparatus 100 further includes a current detector 191, which detects the internal current of the apparatus 100, and a temperature detector 192, which detects the internal temperature of the apparatus 100 during the charging process, so that if overheating, overvoltage or overcurrent occurs, the operation can be stopped.

The battery cell module 230 of the non-contact power reception apparatus 200 further includes a charging circuit 231 for charging a battery cell, a gauge circuit 232 for checking the charged quantity, and a charging monitoring circuit 233 for monitoring the charging state.

A display 193 is further provided to display the state of operation of the non-contact power transmission apparatus 100 and the charging state of the non-contact power reception apparatus 200.

With regard to the fabrication of the power reception coil 211 of the secondary side core 220 of the non-contact power reception apparatus 200, a description thereof will be made later.

Hereinafter, reference will be made to the embodiment of the non-contact power reception apparatus 200 that is provided with both a charging coil and a communication loop antenna at the same time.

Figure 2:
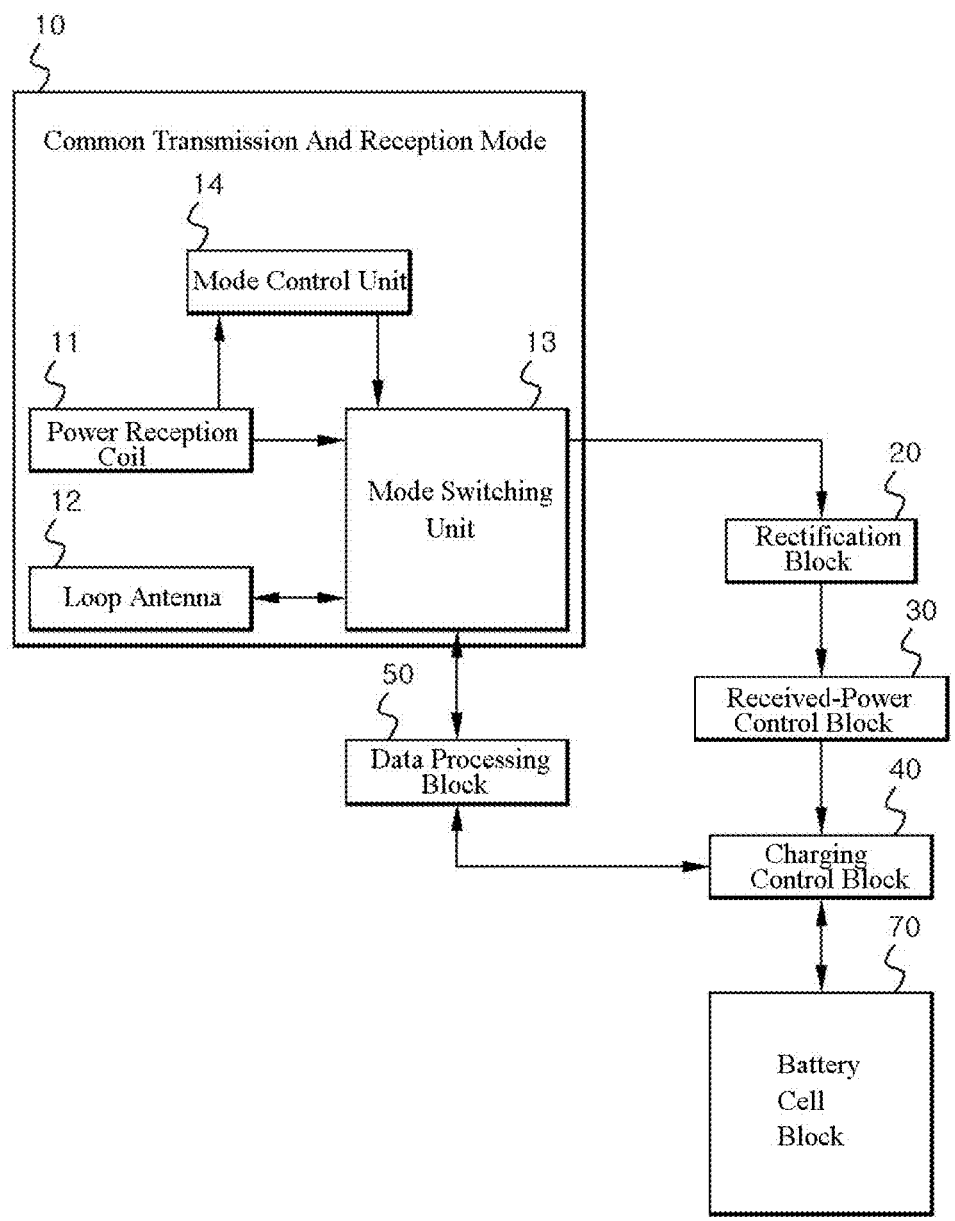
FIG. 2 is a schematic block diagram of another exemplary non-contact power reception apparatus in accordance with the present invention.

FIG. 2 is a schematic block diagram of an exemplary non-contact power reception apparatus illustrative of non-contact charging and a control module of data communication in the portable terminals in accordance with the present invention. The non-contact power reception apparatus includes a common transmission and reception block 210; a rectification block 220, rectifying an AC wireless power signal and converting the same to a DC wireless power signal; a received-power control block 230, controlling the DC signal converted by the rectification block 220 to be converted into chargeable voltage and current (which can be used in the following construction); a charging control block 240, supplying, to a battery cell block 270, electric energy output from the received-power control block 230; a data processing block 250, analyzing and processing transmitted/received data and performing an electronic settlement process; and the battery cell block 270.

Here, the battery cell block 270 consists of a rechargeable battery cell 273, a temperature detecting module 272, and a charging monitoring block 271 for protection.

The common transmission and reception block 210 serves to selectively perform a mode of receiving a wireless power signal to operate the non-contact charging system and a mode of transmitting and receiving data to operate the electronic settlement system, and includes a power reception coil 211, a loop antenna 212, a mode switching unit 213, and a mode control unit 214.

Figure 3:
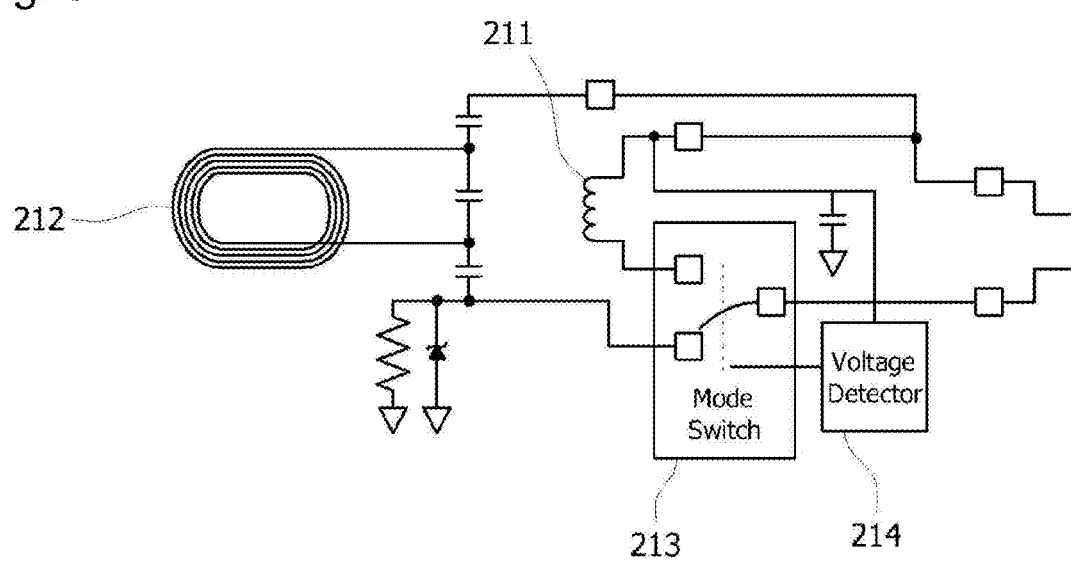
FIG. 3 is a schematic circuit diagram of an exemplary common transmission and reception block of FIG. 2.

The power reception coil 211 serves to receive the wireless power signal from the non-contact charging system, and, as shown in FIG. 3, one end side thereof is connected, at a common contact point, with the loop antenna 212 and output outside the block and another end side thereof is connected with the mode switching unit 213.

The loop antenna 212 serves to transmit and receive data, such as information on settlement by the electronic settlement system, and as shown in FIG. 3, one end side thereof is connected, at a common contact point, with the power reception coil 211 and output outside the block, and another end side thereof is connected with the mode switching unit 213.

The mode switching unit 213 serves to select either one of the power reception coil 211 and the loop antenna 212 and perform a switching operation to allow electrical connection to either one of the rectification block 230 and the data processing block 250. In a state of allowing the loop antenna 212 and the data processing block 250 to be connected, the power reception coil 211 and the rectification block 230 are operated to be connected under the control of the mode control unit 214.

The mode control unit 214 serves to detect a voltage of the power received by the power reception coil 211 and control the switching operation of the mode switching unit 213. Then, the mode control unit compares the detected received-voltage with a reference voltage (a minimum voltage capable of determining a power signal supplied by a non-contact charging system), and outputs the comparison result to the mode switching unit 213.

That is, after detecting a voltage received by the power reception coil 211, the mode control unit 214 performs the control operation so that, if the detected received-voltage is higher than the reference voltage, the mode switching unit 213 performs the switching operation to electrically connect the power reception coil 211 and the rectification block 220, and, if the detected received-voltage is lower than the reference voltage, the mode switching unit 213 performs the switching operation to electrically connect the loop antenna 212 and the data processing block 250.

The mode control unit 214, as shown in FIG. 3, includes a voltage detector 214 that is connected to a common contact point between the power reception coil 211 and the loop antenna 212, so as to detect a voltage induced to the power reception coil 211.

Figure 4:
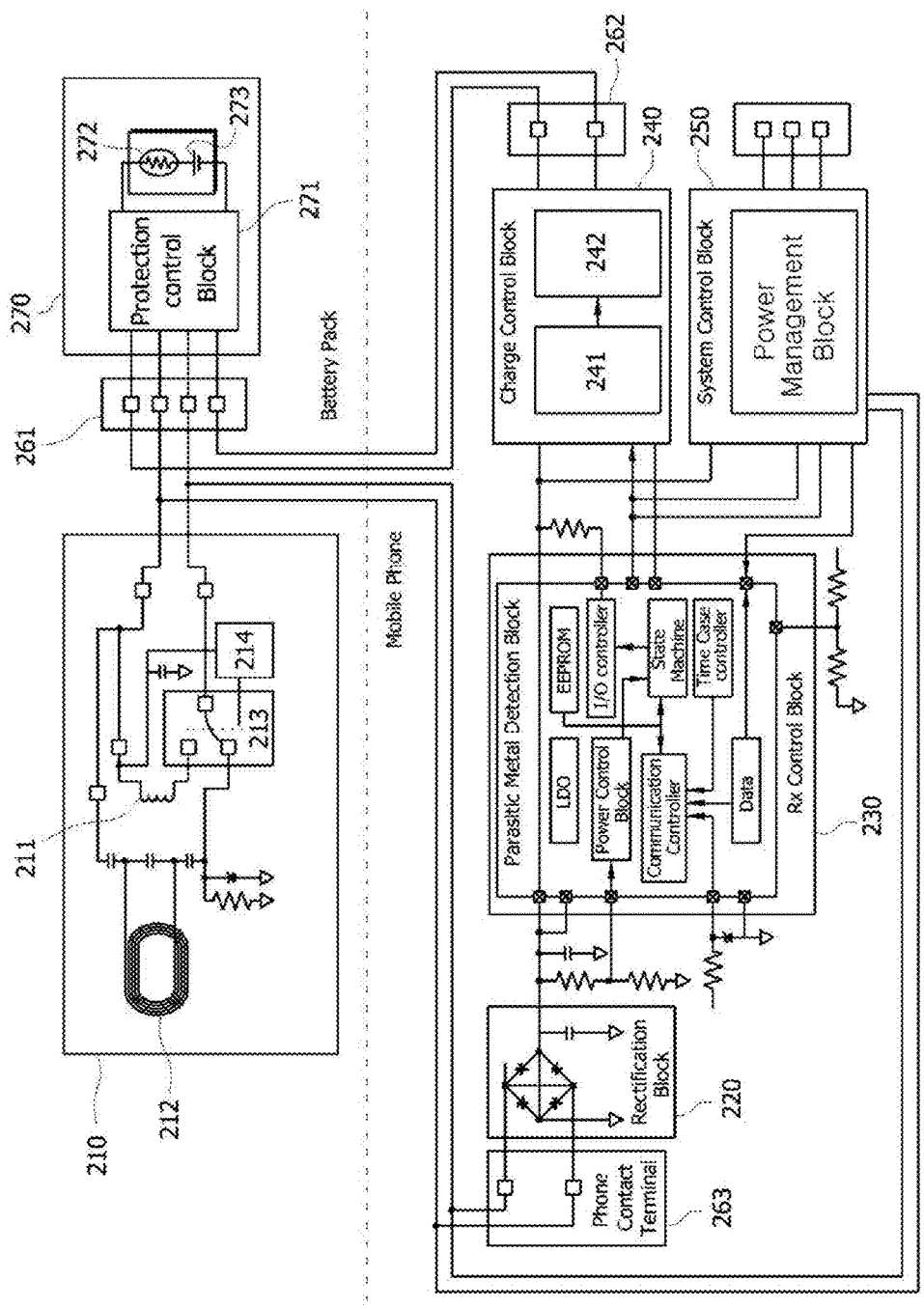
FIG. 4 is a schematic circuit diagram of another exemplary non-contact power reception apparatus in accordance with the present invention.
Figure 5:
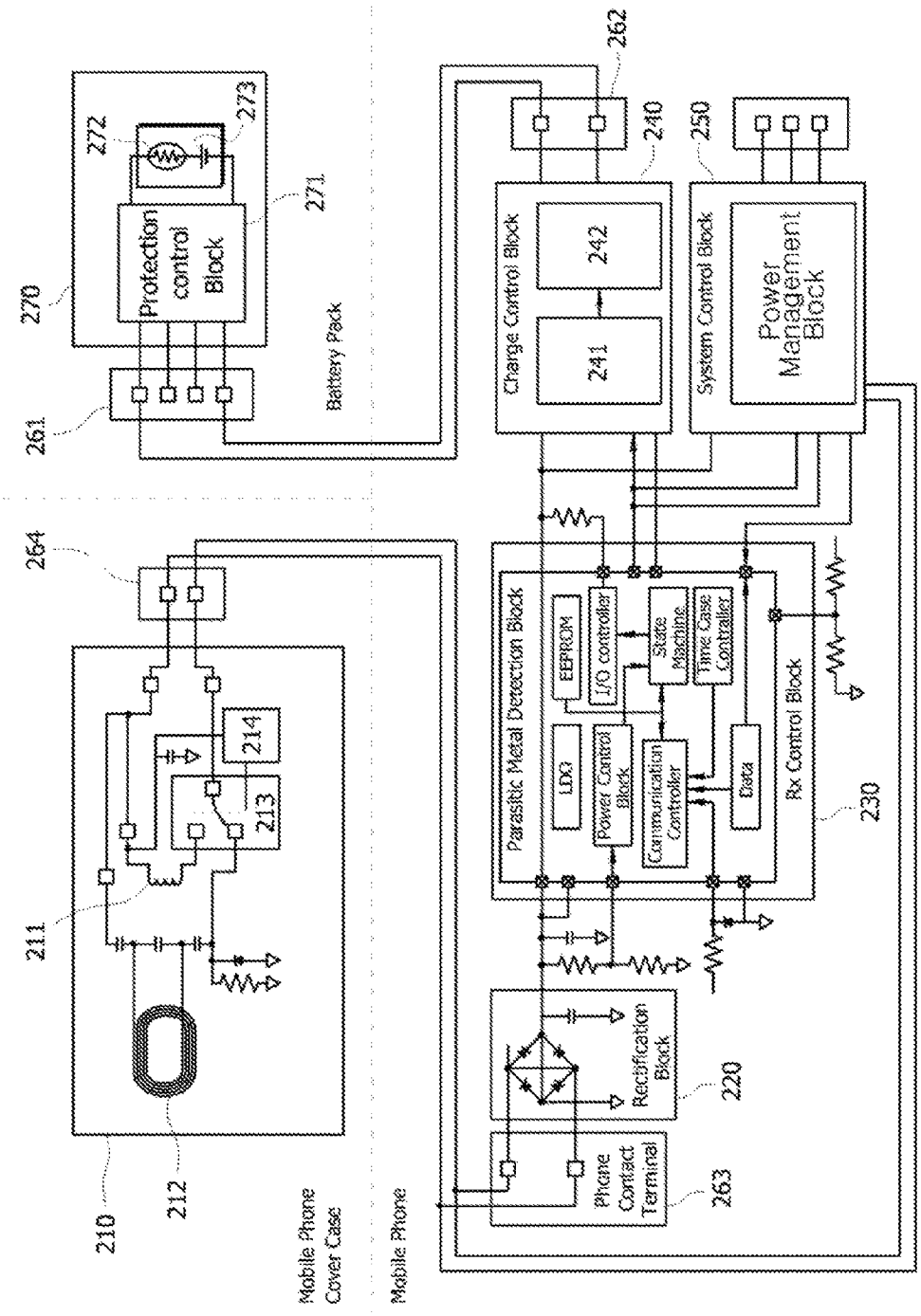
FIG. 5 is a schematic circuit diagram of another exemplary non-contact power reception apparatus in accordance with the present invention.

As shown in FIGS. 4 and 5, reference will now be made to an example in which non-contact charging and the control module of data communication in the portable terminals have been adapted according to the present invention.

Figure 6:
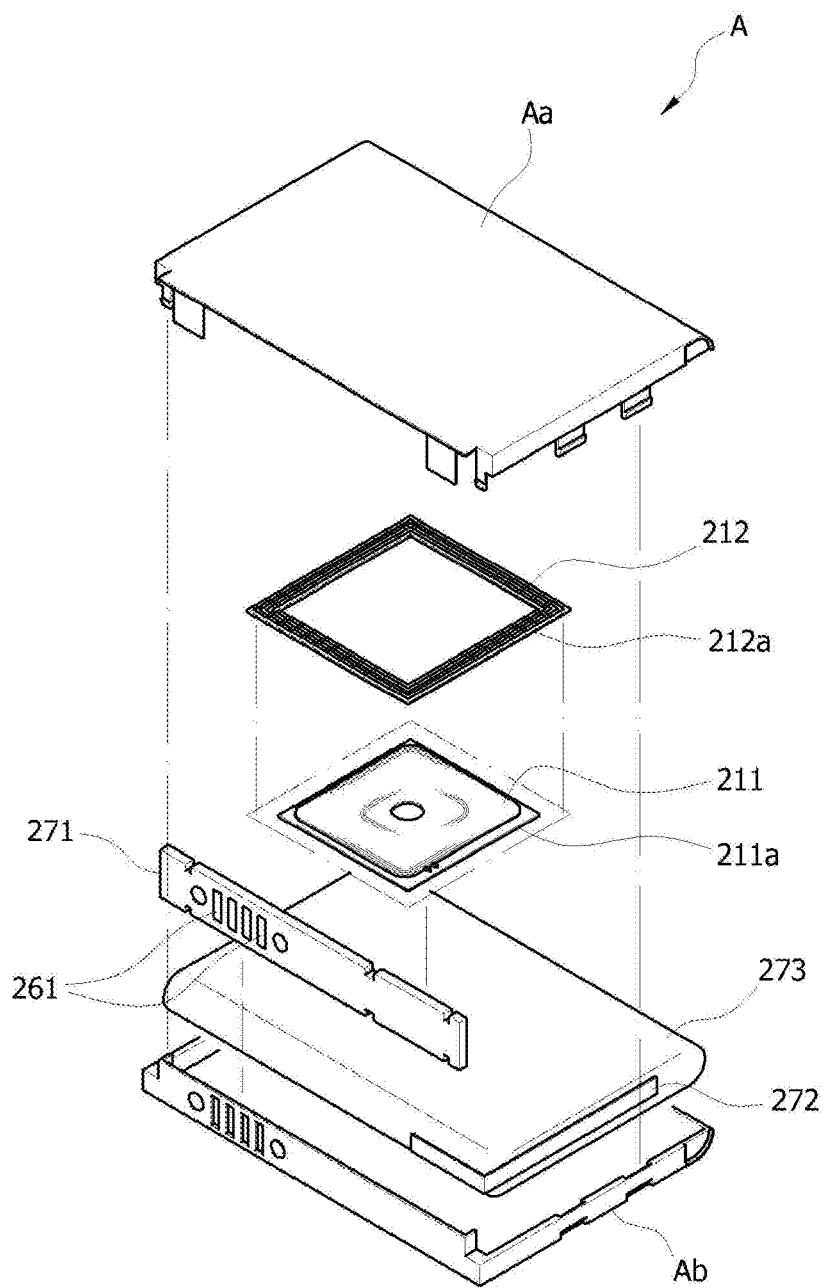
FIG. 6 is an exploded perspective view of an exemplary battery pack for portable terminals in accordance with the present invention.

FIG. 4 is a schematic circuit diagram of an exemplary non-contact power reception apparatus in accordance with the present invention. Referring also to FIG. 6, the apparatus is configured so that the common transmission and reception module 210 is arranged in a battery pack A such that the module 210 is electrically connected with a first connector module 261 of the battery pack A, and the rectification block 220, the received-power control block 230, the charging control block 240, and the data processing block 250 are arranged in a terminal body B of the portable terminal.

Here, the terminal body B is configured such that a second connector module 252, which is to be electrically connected with the charging control block 240, is provided so as to be connected with the first connector module 261 of the battery pack A, and such that a third connector module 263 is provided so as to allow the wireless power signal received by the power reception coil 211 to be supplied to the rectification block 220.

The data that is transmitted/received via the loop antenna 212 communicates with the data processing block 250 via the third connector module 263, and the data processing block 250 analyzes and processes the communicated data and performs a process such as settlement or the like.

Meanwhile, as shown in FIG. 6, the battery pack A is configured to include a battery cell 273, a temperature detecting module 272, and a charging monitoring module 271 in the battery pack A, which consists of an upper case Aa and a lower case Ab.

The power reception coil 211 and the loop antenna 212 are mounted on one side of the battery cell 273 such that a shield plate 211*a* is disposed between the power reception coil 211 and the battery cell 273, and an absorber 212*a* is arranged between the loop antenna 212 and the battery cell 273.

That is, the power reception coil 211 and the loop antenna 212 are provided on different pieces of shielding material on the same plane, thereby minimizing the thickness of the battery pack A.

Here, the power reception coil 211 has a structure in which a plurality of windings is wound around it, and the loop antenna 212 has a loop type structure, so that it is preferred that, as shown in FIG. 6, the power reception coil 211 is provided in the center of the apparatus, and the loop antenna 212 is provided outside the power reception coil.

Thus, according to the arrangement shown in FIGS. 4 and 6, the power reception coil 211, which receives a non-contact wireless power signal and charges a battery, and the loop antenna 212 for data communication for electronic settlement are arranged on the same plane, and the common transmission and reception block 212, which includes the power reception coil 211 and the loop antenna 212, is mounted in the battery pack A, so that the thickness of the battery pack A can be minimized, fabricating costs can be reduced, and the rectification module 220, the received-power control block 230, the charging control block 240, and the data processing block 250 can also use modules mounted in the portable terminal body B.

The detailed electrical connection between the respective elements of FIG. 6 or the like is modifiable into various forms by persons skilled in the art, so that it is not limited to the specific construction of FIG. 7, which is to be described later.

FIG. 5 is a schematic circuit diagram of an exemplary non-contact power reception apparatus in accordance with the present invention. Referring also to FIG. 7, the apparatus is configured so that the common transmission and reception module 210 is arranged in a cover case C such that the module 210 is electrically connected with a fourth connector module 264 of the cover case C, the fourth connector module 264 is connected with a third connector module 263 of the terminal body B, and the rectification block 220, the received-power control block 230, the charging control block 240, and the data processing block 250 are arranged between the third connector module 263 and the second connector module 262 in the terminal body B.

The second connector module 262 of the terminal body B is connected with the first connector module 261 of the battery pack A.

Figure 7:
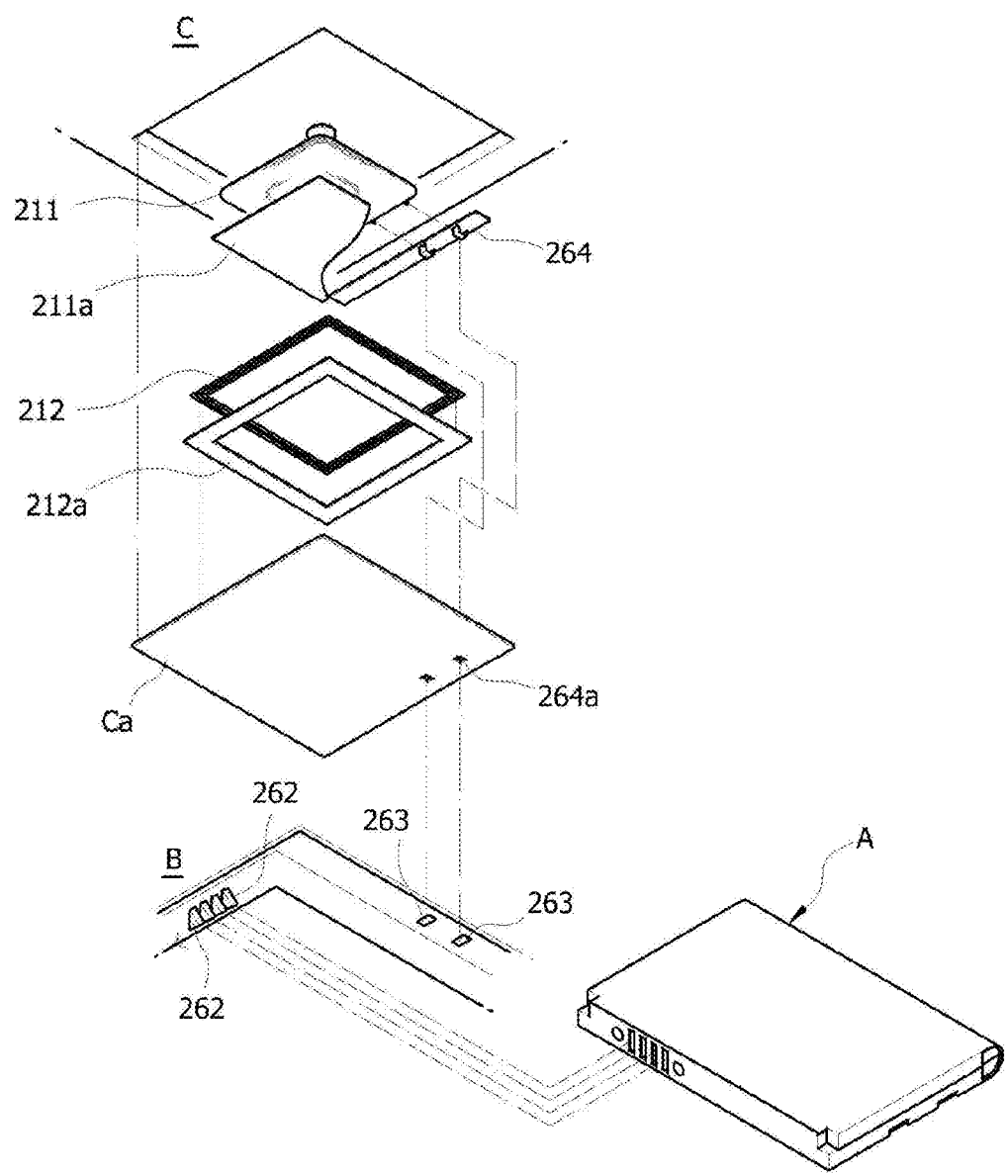
FIG. 7 is an exploded perspective view of an exemplary battery pack and a cover case for portable terminals.

Meanwhile, the cover case C is configured so that, as shown in FIG. 7, space (not designated) for the common transmission and reception block 210 is formed in the cover case C, and the power reception coil 211 and the loop antenna 212 are mounted in the space such that a shield plate 211a is disposed on the power reception coil 211, and an absorber 212a is arranged on the loop antenna 212.

Here, as shown in FIG. 7, preferably, the cover case includes the power reception coil 211 in the center thereof and the loop antenna 212 outside the power reception coil.

Thus, according to the arrangement shown in FIGS. 5 and 7, the power reception coil 211, which receives a non-contact wireless power signal and charges a battery, and the loop antenna 212 for data communication for electronic settlement are arranged on the same plane, and the common transmission and reception block 212, which includes the power reception coil 211 and the loop antenna 212, is mounted in the cover case C, so that the thickness of the cover case C can be minimized, and the rectification module 220, the received-power control block 230, the charging control block 240, and the data processing block 250 are mounted in the terminal body B, so that traditional battery packs can continue to be used.

Meanwhile, in order to minimize the size of the non-contact power transmission apparatus and the non-contact power reception apparatus, the power reception cores 211 according to the above embodiments are preferably fabricated to be thin. Thus, a coil is used in which a coil wire, which comprises a plurality of thin metal wires, is wound around itself in the winding diameter.

In non-contact charging, a shielding sheet is generally provided on one side of a secondary coil in order to protect electric circuit elements from electromagnetic waves.

Here, if the secondary coil is circular, there is no coil near the four corners of the rectangular shield sheet, so that an eddy current is generated, thus raising the temperature.

Due to the non-contact power transmission nature, the positions of the primary core and the secondary core are variable, so that the mobility and transmission efficiency for the secondary core become an important evaluating reference for the reliability of products.

Generally, the coil may be shaped so that a transmitter and a receiver are circular windings, or otherwise so that the transmitter is circular windings and the receiver is rectangular windings.

Here, if the coil of the receiver is circular, mobility is excellent, whereas power transmission efficiency suffers because area is decreased compared to the rectangular coil. If the coil is rectangular, relative to the circular coil, power transmission efficiency is excellent, but mobility suffers.

According to the present invention, a jig is provided which facilitates fabricating the secondary core for the non-contact reception apparatus, the secondary core is configured to have the shape of both a circle and a rectangle, so that the mobility and transmission efficiency for the secondary core can be advantageously improved at the same time, by combining the advantages of a circular coil and a rectangular coil.

Figure 8:
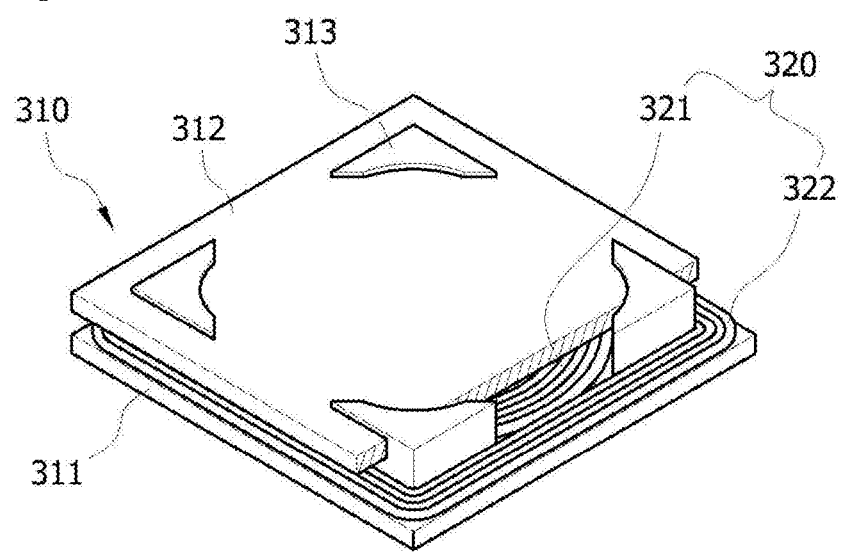
FIG. 8 is a partially cut away perspective view of an exemplary jig for fabricating a core for the non-contact power reception apparatus in accordance with the present invention.

FIG. 8 is a partially cut away perspective view of an exemplary jig for fabricating the non-contact power reception apparatus, showing a double-structure core 320 wound around the coil-winding jig 310, the double-structure core consisting of circular and rectangular core portions.

The coil-winding jig 310 includes a lower disk 311, an upper disk 312, and a guide unit 313 guiding the double-structure core 320 so that the circular and rectangular core portions are separately wound around the coil-winding jig 310.

Figure 9:
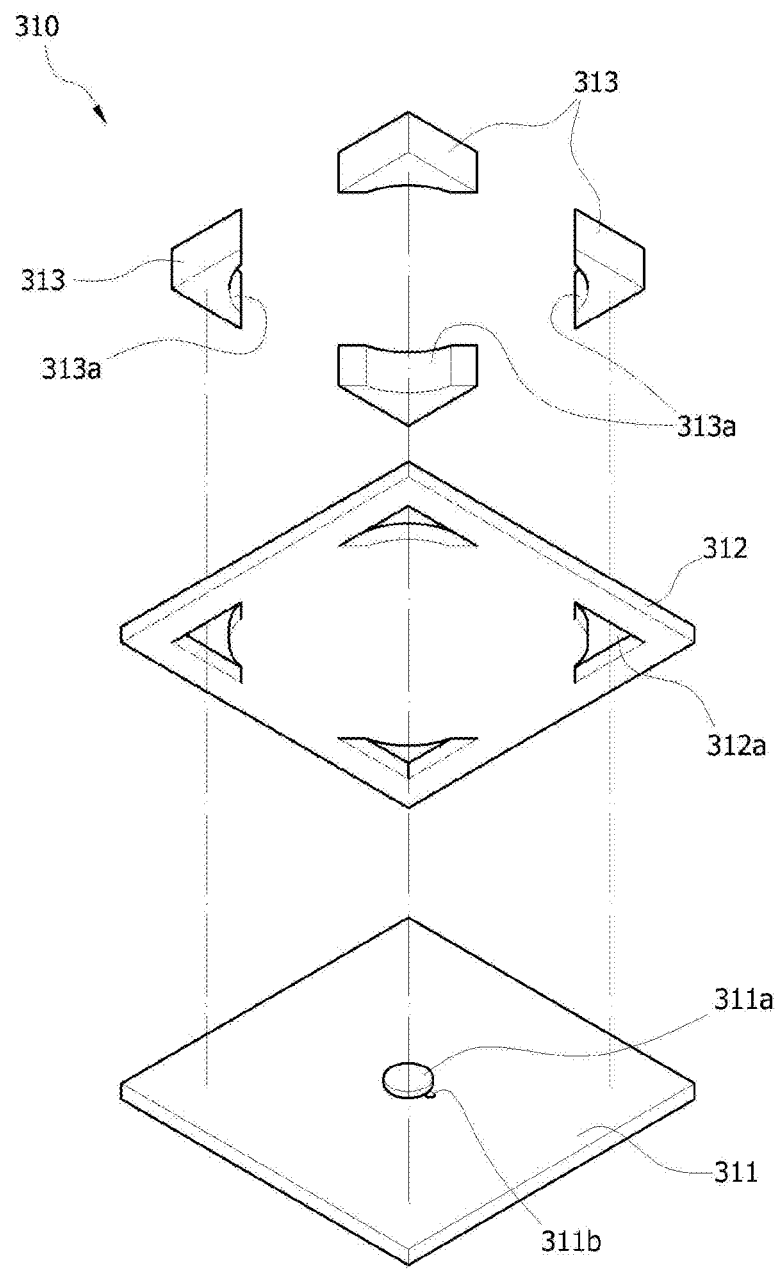
FIG. 9 is an exploded perspective view of the jig of FIG. 8.

The lower disk 311 is formed in a planar form as shown in FIG. 9, and has a winding protrusion 311a, about which the double-structure core is wound, in the center of the upper surface thereof.

Here, it is preferred that the height of the winding protrusion 311a be greater than the height (diameter) of the coil wire.

A through-hole 311b is formed adjacent to the winding protrusion 311a, as shown in FIG. 3.

The through-hole 311b passes through the lower disk 311, and is formed at an incline, preferably, as shown in FIG. 13. The inclined through-hole 311b prevents the coil wire from being drawn up towards the upper portion of the lower disk 311 when the double-structure core 320 is wound.

The upper disk 312 is placed above the lower disk at a certain distance therefrom, and is formed in a planar form, preferably like the lower disk 311, as shown in FIG. 9.

Here, various methods of separating and fixing the lower and upper disks 311 and 312 can be adopted, without being limited to a specific one, as desired by persons skilled in the art.

For example, a separate holder holds and fixes one side (opposite corner or the like) of the upper disk 312, so that the upper disk can be separated from the lower disk 311.

The upper disk 312 has at least one slide hole 312a, and preferably, at least four slide holes.

The guide unit 313 is inserted into the slide hole 312a in the upper disk 312 so that the guide unit is movable in a vertical direction. It is preferred that, as shown in FIG. 9, if the outer surface extends, an imaginary rectangle is formed, and if the inner surface extends, an imaginary circle is formed.

That is, the guide unit 313 has a shape corresponding to the corners of a rectangle (preferably, a rectangular plane having a certain thickness) and an inner curved section 313a corresponding to a circle.

Figure 10:
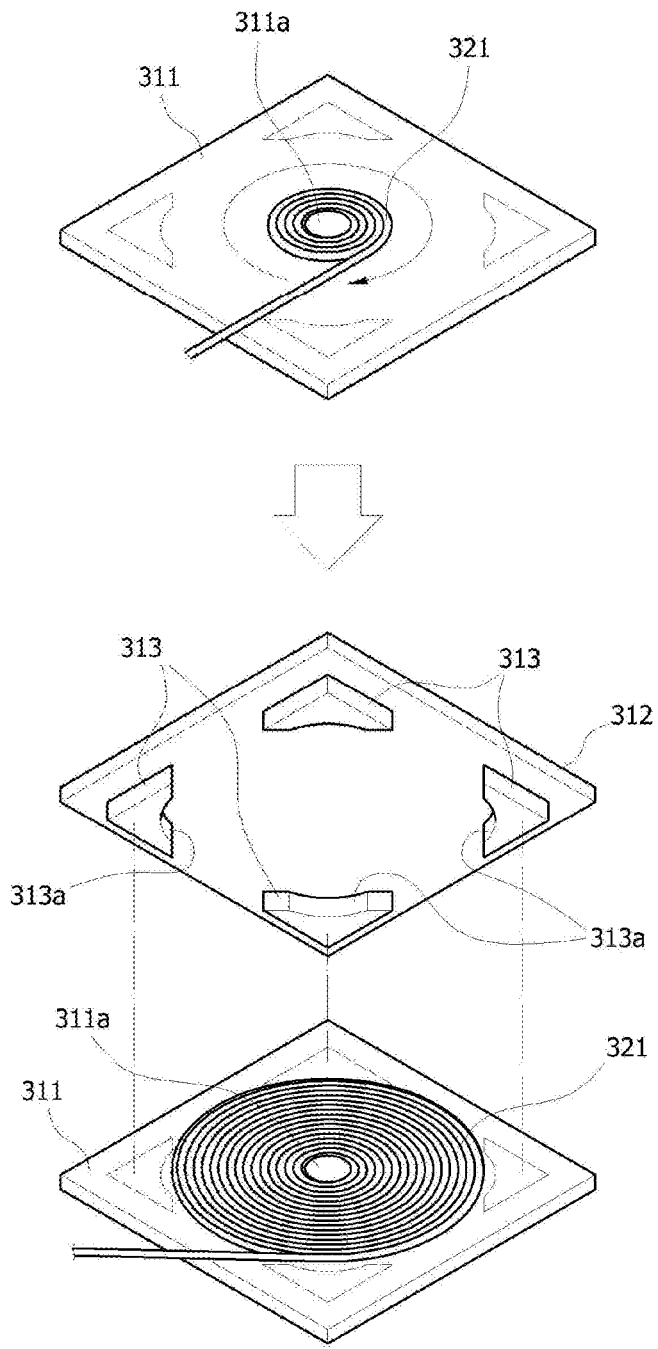
Figure 12:
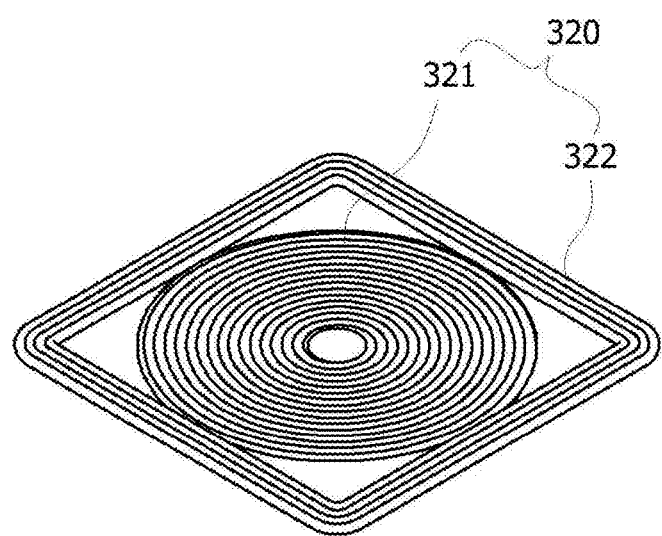
FIG. 12 is a perspective view of the double-structure core fabricated using the jig of FIG. 8.

Hereinafter, a method of fabricating a double-structure core 320 using the jig 310 for the non-contact power reception apparatus will be described with reference to FIGS. 10 and 11.

Here, various kinds of separate devices for controlling the construction of the present invention, such as a separator for separating the upper disk 312, a winder for coiling wire, and the like, may be adopted, without being limited to a specific one, as desired by those skilled in the art.

First, a coil wire (not designated) as a basic unit of the double-structure core 320 is inserted into the through-hole 311b of the lower disk 311 from a lower side thereof and drawn upwards.

Here, as desired by a person skilled in the art, the coil wire may of course be inserted into the through-hole from the upper side thereof and drawn downwards.

The drawn coil wire is circularly wound about the winding protrusion 311a to form a first coil 321.

Here, in the case where the winding protrusion 311a is provided to have the same height as the thickness (height) of the coil wire and the undersurface of the upper disk 312 is separated by the height of the winding protrusion 311a, winding the coil wire is of course easily performed.

If the diameter of the first coil 321 increases to reach an imaginary circular diameter by the inner curved section 313a of the guide unit 313 as the coil wire is wound, winding the coil wire stops and the formation of the first coil 321 is completed.

After the completion of the formation of the first coil 321, the guide units 313 provided in the upper disk 321 are slid and lowered.

Here, it is preferred that the curved section 313a of the guide unit 313 come close to the outer circumference of the first coil 321.

When the lower surface of the guide unit 313 has come close to the upper surface of the lower disk 312 through the above process, the coil wire is wound around the outer surface of the guide unit 313 to form a second coil 322.

Here, the coil wire for forming the second coil 322 may be different from that for the first coil 321, but it is preferred that the coil wire forming the first coil 321 be continuously used while extending from the first coil.

If the second coil 322 formed by the coil wire corresponds to the area (size) of the lower or upper disk 311 or 312, as shown in FIG. 11, the formation of the second coil 322 is completed.

After the double-structure core 320 has been completely fabricated through the above process, the double-structure core 320, consisting of first and second coils 321 and 322, is removed from the coil-winding jig 310.

Thus, the wireless power transmission double-structure core is fabricated such that the first circular coil 321 is provided in the center thereof and the second rectangular coil 322 is provided outside the first coil, so that the core with advantageous circular and rectangular coils have can be accomplished.

As set forth above, non-contact charging, the data communication control module and its arrangement in the portable terminal have been described above. It is understood that the technical construction of the present invention may be modified to have different forms without departing from the spirit and essential features of the present invention by those skilled in the art.

Therefore, the above-mentioned embodiments are provided only for illustrative purposes in all aspects, and the invention is not limited thereto. It should be understood that the scope of the present invention is defined not by the above detailed description, but by the appended claims, and that the described embodiments and all variations or modifications that can be deduced from equivalents interpreted from the claims fall within the scope of the present invention.

The invention claimes is:

1. A non-contact power reception apparatus comprising:
a common transmission and reception block selectively performing a mode of receiving a wireless power signal and a mode of transmitting and receiving a data;
a rectification block rectifying the power signal received by the common transmission and reception block in the mode of receiving the wireless power signal;
a received-power control block controlling the power signal rectified by the rectification block:
a charging control block controlling charging of a battery pack using electric energy of the power signal controlled by the received-power control block; and
a data processing block transmitting and receiving the data via the common transmission and reception block in the mode of transmitting and receiving data,
wherein the common transmission and reception block includes:
a power reception coil receiving the wireless power signal;
a loop antenna for the transmission and reception of the data;
a mode switching unit selecting either one of the power reception coil and the loop antenna and allowing electrical connection to either one of the rectification block and the data processing block; and
a mode control unit detecting a received-voltage of the power reception coil and controlling a switching operation of the mode switching unit.

2. The non-contact power reception apparatus according to claim 1, wherein the mode control unit performs a control operation so that,
if the detected received-voltage is higher than a reference voltage, the mode switching unit performs the switching operation to electrically connect the power reception coil and the rectification block, and
if the detected received-voltage is lower than the reference voltage, the mode switching unit performs the switching operation to electrically connect the loop antenna and the data processing block.

3. The non-contact power reception apparatus according to claim 2, wherein the mode control unit includes a voltage detector for detecting the received-voltage of the power reception coil, comparing the detected received-voltage with the reference voltage and outputting the comparison result.

4. The non-contact power reception apparatus according to claim 1, wherein the data is the data for electronic settlement with an external electronic device.

* * * * *